United States Patent [19]

Otto, Jr. et al.

[11] Patent Number: 4,536,034

[45] Date of Patent: Aug. 20, 1985

[54] METHOD FOR IMMOBILIZING CONTAMINANTS IN PREVIOUSLY LEACHED ORES

[75] Inventors: John B. Otto, Jr., Dallas; James M. Paul, DeSoto, both of Tex.

[73] Assignee: Mobil Oil Corporation, New York, N.Y.

[21] Appl. No.: 484,766

[22] Filed: Apr. 14, 1983

[51] Int. Cl.³ .............................................. E21B 43/28
[52] U.S. Cl. .......................................... 299/5; 299/4; 423/11; 423/15
[58] Field of Search .................... 299/4, 5; 423/11, 15

[56] References Cited

U.S. PATENT DOCUMENTS

| | | | |
|---|---|---|---|
| 4,108,722 | 8/1978 | Stover | 299/4 |
| 4,311,341 | 1/1982 | DeVries et al. | 299/5 |
| 4,311,676 | 1/1982 | Demarthe et al. | 423/15 |
| 4,346,936 | 8/1982 | Yan | 299/4 |
| 4,378,131 | 3/1983 | Strom | 299/5 |
| 4,418,961 | 12/1983 | Strom et al. | 299/5 |

OTHER PUBLICATIONS

Yan, "Calcium Control in In-Situ Uranium Leaching Process", 11/80, pp. 2068–2073.

Primary Examiner—Stephen J. Novosad
Assistant Examiner—Mark J. DelSignore
Attorney, Agent, or Firm—Alexander J. McKillop; Michael G. Gilman; Charles A. Malone

[57] ABSTRACT

This invention relates to a process for reducing to environmentally acceptable levels the amount of soluble or mobile contaminants in formations that have been subjected to in situ leaching to recover mineral values therefrom. The present process is also applicable to surface milling operations. In accordance with the present invention, an aqueous solution containing orthophosphates is introduced into the formation to immobilize contaminants by forming a relatively stable precipitate. For example, radionuclides such as uranium, thorium or radium form stable precipitates with orthophosphates.

When the formation fluids contain a high concentration of carbonates, the formation fluids are treated to reduce the carbonates concentration to levels which do not substantially interfere with the phosphate precipitation of contaminants.

16 Claims, No Drawings

METHOD FOR IMMOBILIZING CONTAMINANTS IN PREVIOUSLY LEACHED ORES

FIELD OF THE INVENTION

The present invention relates to a method to chemically immobilize contaminants, such as radionuclides and heavy metals, that are solubilized during solution mining of mineral values from mineral-containing ores. More particularly, this application relates to a method for restoring to environmentally acceptable levels the amount of contaminants in a formation subsequent to leaching operations.

BACKGROUND OF THE INVENTION

The recovery of mineral values from mineral-bearing ores may be achieved by either in situ leaching or surface leaching operations. In surface leaching, the mineral-containing ores are mined to the surface where they may be crushed and mixed. The ores are held in holding tanks where they are subsequently subjected to surface leaching operations to recover the mineral values therefrom. Surface leaching, such as heat leaching or various other types of mill leaching, usually comprises oxidation of the mineral values and the solubilization thereof.

In situ solution mining of mineral values is a known alternative to surface recovery processes particularly when the latter are not economically feasible. Conventionally, in in situ solution mining processes, the leaching solution is brought into contact with the subterranean deposit through a suitable injection system. The leaching solution or lixiviant may be an alkaline or acidic medium which solubilizes the mineral values as it traverses the ore body. Often, the mineral values in an ore body are subjected to an oxidation step in order to convert them to a soluble form. For example, the tetravalent uranium must be oxidized to its soluble hexavalent form for leaching. The pregnant lixiviant, whether resulting from surface or in situ leaching operations, is then withdrawn from the ore body and treated to recover mineral values therefrom by suitable techniques such as solvent extraction, direct precipitation or by absorption and elution employing an ion exchange resin. All too often, however, and in fact in the majority of cases, the leaching will result in the release of other mineral values than the desired mineral value into the leachate. These other mineral values may not be present in sufficient quantities to justify surface recovery. However they may be present in large enough quantities wherein the formation fluids have to be treated to reduce the concentration of such mineral values or contaminants to environmentally acceptable levels. Additionally, after the recovery of the desired mineral values, the formation fluids have to be treated to reduce the content of solubilized radionuclides and heavy metals to environmentally acceptable levels.

For example, recovery of uranium values from subterranean formations involves the usual methods of oxidation of insoluble tetravalent uranium into soluble uranyl complexes that may be drawn from the formation by leaching. The overall reaction in oxidative in situ leaching may be described as follows:

$$UO_2 + [O] + 3HCO_3^- \rightarrow UO_2(CO_3)_3^{-4} + H^+ + H_2O$$

The use of oxygen, however, also solubilizes other minerals and radionuclides. Thus, when the leaching operations are terminated, restoration of the contaminants in the formation becomes necessary. For example, in New Mexico current environmental regulations restrict the amount of uranium permissible in formations after leaching to less than 0.1 ppm. Other radionuclides, such as radium and thorium for example, are subject to similar restrictions.

Accordingly, the present invention provides a process for reducing the contaminants level, including mineral and radionuclide contaminants, in the formation fluids after the formation has been subjected to oxidative in situ leaching to recover mineral values therefrom.

SUMMARY OF THE INVENTION

The present invention relates to a method for restoring to environmentally acceptable levels the soluble contaminants in a subterranean formation that has been subjected to oxidative leaching which comprises contacting the contaminants with phosphate ions, wherein the contaminants are those ionic species that when subjected to phosphate ions form a precipitate which is insoluble in the formation fluids. In one embodiment, the invention comprises passing through said formation at least one pore volume of an aqueous restoration fluid which contains phosphate ion. The restoration fluid may contain from 0.01 to 1.0 grams per liter of phosphate ion.

The method of this invention has the advantages of simplicity and effectiveness in restoring contaminants concentrations to acceptable environmental background levels. The invention thus reduces the environmental background levels. The invention thus reduces the environmental hazards to humans and animals which high levels of contaminants in the formation fluids may pose. Further advantages and features of this invention will be apparent to persons skilled in art upon reading the specification and the claims appended hereto.

DESCRIPTION OF THE SPECIFIC EMBODIMENTS

While the present invention is hereinafter described in relation to restoration after in situ recovery of uranium, it should be understood that the invention is also applicable to restoration efforts after the in situ recovery of inorganic substances capable of reacting with aqueous solubilizers to form solutions miscible with water. These inorganic substances especially include iron, aluminum, titanium, copper, nickel, silver, gold, lead, zinc, manganese, cobalt, chromium, radium, thorium, calcium and magnesium. Other substances soluble in aqueous solubilizers will be apparent to those skilled in the art.

The present invention may be carried out utilizing injection and production systems as defined by any suitable arrangement of wells. The injection and production wells can be arranged in any convenient pattern designed to achieve maximum contact of the uranium containing zones by the leaching fluids, such as the conventional "five spot" pattern wherein a central well is surrounded by four somewhat symmetrically located injection wells. Another of the conventional flooding patterns that can be employed in the practice of this invention is the "line drive" pattern in which the injection wells are arranged in a line so that the injection fluids advance through the formation toward one or more spaced production wells that can also be arranged in a line substantially parallel to the line of injection wells. Other suitable patterns include staggered line drive, four spot, seven spot, circular flood patterns and others.

Uranium minerals frequently occur as a mixture of the insoluble tetravalent form and the soluble hexavalent form. The tetravalent form must be oxidized to its soluble hexavalent form for leaching. The oxidation of uranium to its soluble form also results in the oxidation and/or solubilization of other mineral values that are present in the formation such as calcium, magnesium, iron, aluminum, titanium, copper, nickel, chromium, manganese, cobalt, zinc, gold, silver, thorium, radium, and lead. These other mineral species may not be present in sufficient quantities to justify surface recovery. However, they are normally present in large enough quantities to require treatment of the formation fluids to reduce the concentration of these other mineral values to environmentally acceptable levels following the termination of the leaching process.

The restoration of formations that have been subjected to in situ leaching is a practice commonly required for environmental reasons. It has been found in connection with this invention that the passage through the formation of a restoration fluid which contains phosphate ions will form a precipitate with the soluble ions of the contaminants in the formation to form insoluble phosphate precipitates. For example, uranium, thorium, radium and lead phosphates are extremely insoluble in formation fluids.

Any suitable source of orthophosphates may be utilized in accordance with the present invention. For example, alkali metal orthophosphates, such as sodium or potassium orthophosphates, may be utilized.

The concentration of the orthophosphate solution should be determined experimentally on a case by case basis. The amount of orthophosphates utilized should be adjusted such that the concentration of the contaminants in formation fluids is reduced to environmentally acceptable levels. For example, a phosphate ion concentration of from 10 ppm to about 1000 ppm is particularly suitable.

When a carbonate or bicarbonate solution is utilized to leach the uranium, the presence of carbonate ion in the formation fluids after the leaching step, may interfere with the precipitation of the contaminants. Accordingly, the fluids should be treated to remove the carbonate ions. For example, the addition of calcium will cause the precipitation of calcium carbonate particularly at pH values of 8 or higher. Alternatively, acid, such as hydrochloric (HCl) may be added to free the carbonate ion in the form of carbon dioxide. Table 1 shows the effect of carbonate concentration on the immobilization of uranium by precipitation as uranyl phosphate.

TABLE 1

| $CO_3^=$ ppm | pH | COMMENTS |
| --- | --- | --- |
| 1,000 to 2,000 | 6–6.5 | Uranium is rapidly precipitated with 2-fold excess phosphate. |
| 4,000 | 6–6.5 | Uranium precipitates slowly with a 10-fold excess phosphate. |
| 10,000 | 6–6.5 | No precipitation even with a 147-fold excess phosphate. |

Although the present invention has been described with preferred embodiments, it is to be understood that modifications and variations may be resorted to, without departing from the spirit and scope of this invention, as those skilled in the art will readily understand. Such modifications and variations are considered to be the purview and scope of the appended claims.

What is claimed is:

1. A method for restoring a subterranean formation subjected to oxidative leaching, excluding a carbonate leaching process, to environmentally acceptable levels of soluble contaminants by use of an aqueous restorative fluid comprising:
    (a) making said restorative fluid with sufficient phosphate ions therein and a pH value suitable for forming insoluble precipitates in said fluid with the ions of said soluble contaminants; and
    (b) injecting said restorative fluid into said formation in a volume sufficient to form an insoluble precipitate within said formation.

2. The method as recited in claim 1 where in step (b) at least one pore volume of said restorative fluid is injected into said formation.

3. The method as recited in claim 1 where in step (a) the restorative fluid contains from about 0.01 to about 1.0 grams per liter of phosphate ions.

4. The method of claim 1 wherein the phosphate ion solution is a buffered phosphate ion solution.

5. The method of claim 1 wherein the contaminants are one or more of ionic species selected from the group consisting of those containing uranium, chromium, iron, aluminum, titanium, copper, nickel, thorium, radium, lead, cobalt, zinc, calcium, magnesium, manganese, gold and silver.

6. The method of claim 1 wherein the phosphate ion aqueous solution is obtained by solubilizing an alkali metal orthophosphate in an aqueous medium.

7. The method of claim 1 wherein the phosphate ion aqueous solution is obtained by solubilizing sodium phosphate, potassium phosphate or any combination thereof in an aqueous medium.

8. The method of claim 1 wherein the phosphate ion concentration in the phosphate ion aqueous solution is from about 10 ppm to about 1,000 ppm.

9. A method for restoring a subterranean formation subjected to carbonate leaching to environmentally acceptable levels of soluble contaminants by use of an aqueous restorative fluid comprising:
    (a) treating the formation to reduce the carbonate concentration to a level which will not interfere with the forming of precipitates with said soluble contaminants; and
    (b) introducing into the formation an aqueous restorative fluid containing sufficient phosphate ions therein and a pH value of from about 6.0 to about 6.5 which forms insoluble precipitates in said fluid with the ions of said soluble contaminants.

10. The method of claim 9 wherein the carbonate concentration is reduced to 2,000 ppm or less.

11. The method of claim 9 wherein the carbonate concentration is reduced by precipitating the carbonate as calcium carbonate.

12. The method of claim 9 wherein the carbonate concentration is reduced by treating the formation with an acid to release the carbonate as carbon dioxide.

13. The method of claim 9 wherein the contaminants are those belonging to the group consisting of uranium, thorium, radium, copper, calcium, magnesium, lead, cobalt, manganese, nickel, zinc, titanium, silver, gold, chromium, aluminum, iron or any combination thereof.

14. The method of claim 9 wherein the phosphate ion aqueous solution is obtained by solubilizing an alkali metal orthophosphate in an aqueous medium.

15. The method of claim 9 wherein the phosphate ion aqueous solution is obtained by solubilizing sodium phosphate, potassium phosphate or any combination thereof in an aqueous medium.

16. The method of claim 9 wherein the phosphate ion concentration in the phosphate ion aqueous solution is from about 10 ppm. to about 1,000 ppm.

* * * * *